Nov. 10, 1959 G. B. HAHN 2,912,255
BICYCLE KICK STAND
Filed April 29, 1957
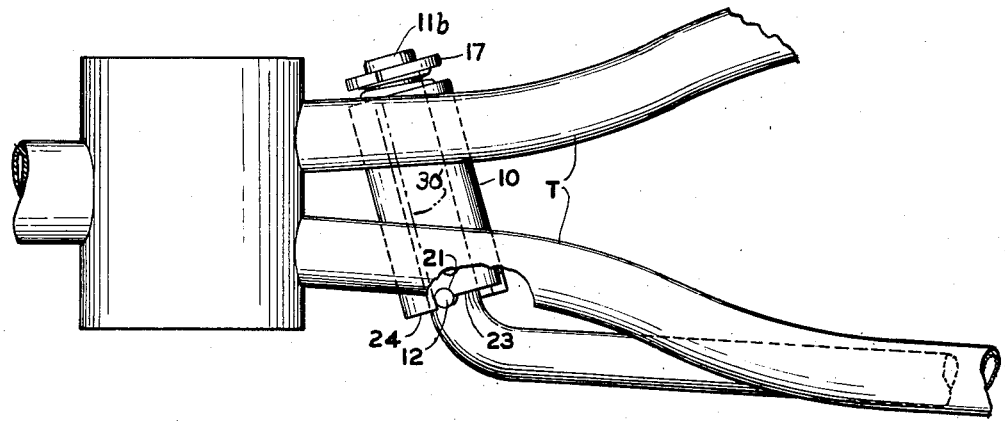
FIG. 2
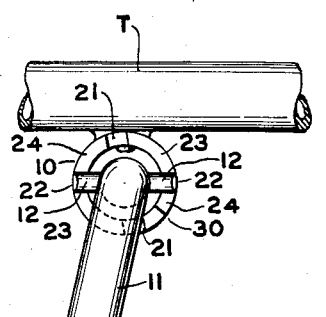
FIG. 3
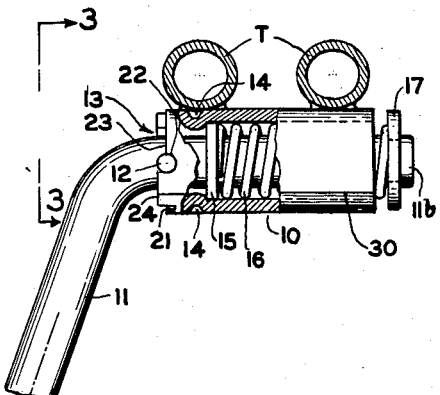
FIG. 1
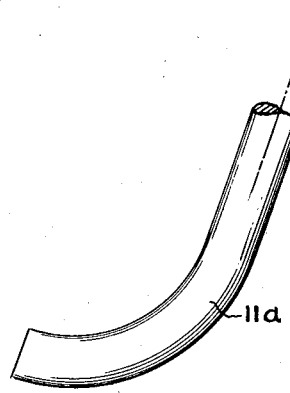
INVENTOR.
GILBERT B. HAHN
BY Golrick & Golrick
ATTORNEYS

United States Patent Office 2,912,255
Patented Nov. 10, 1959

2,912,255

BICYCLE KICK STAND

Gilbert B. Hahn, Lyndhurst, Ohio, assignor to The Murray Ohio Manufacturing Company, Cleveland, Ohio, a corporation of Ohio Application April 29, 1957, Serial No. 655,736

2 Claims. (Cl. 280—301)

The present invention is concerned generally with a bicycle kick stand and method of fabrication of the same; and more particularly with a simple form of kick stand adapted to be integrally secured to the lower rear fork tubes of a bicycle frame.

By the kick stand of the present invention there is provided a simplified structure of tubular housing adapted to be welded to a bicycle frame in appropriate location, in a prop arm including at one end a short straight pivot shaft portion bent at an angle to the arm to extend through the housing with the housing end adjacent the depending supporting arm portion provided with a detent or latching notch formation for latching engagement with a transverse pin in the pivot shaft; a latch biasing prestressed helical compression spring located in greater part within the housing to bear against a reaction surface therein and giving lengthwise bearing support to the pivot shaft; and a simple retaining ring or clip on the free end of the pivot shaft for retaining the spring thereon and serving to hold the assembly together. The form of the housing is such that it is readily made by simple well-known flat stock metal fabrication methods whereby the housing with necessary detent formations thereon may be blanked out of flat stock and formed into a cylindrical tubular element with certain inward projections for spring support thereafter produced by inward deformation of the wall by ordinary staking operations. The prop likewise is of form readily adapted for production by usual simple metal working operations.

The general object then is the provision of a rugged durable kick stand of simple structure easily assembled to a bicycle frame. Another object is the provision of a kick stand readily produced by low cost mass production methods. Another object of the invention is the provision of a method for fabricaton of a kick stand. Other objects and advantages will appear from the following description and the drawings wherein:

Fig. 1 is a rear elevational view of the kick stand as applied to the rear fork tubes of a bicycle with certain portions broken away for clarity of representation, the kick stand shown in lowered or bicycle supporting position;

Fig. 2 is a plan view corresponding to Fig. 1 but with the kick stand arm in retracted position; and Fig. 3 is again a fragmentary view of the kick stand taken endwise of the housing as indicated in Fig. 1 by the line 3—3.

In the drawing there is represented in fragmentary form the lower rear fork tubes T of a bicycle in the region immediately behind the pedal sprocket hanger, where the tubes converge sharply and then continue forwardly in slightly convergent but spaced disposition to join the rear of the tubular pedal hanger housing on opposite sides of the longitudinal vertical plane of symmetry of the bicycle frame. To the lower surface of the fork tubes there is secured a kick stand embodying the present invention.

The kick stand comprises a cylindrical tubular housing 10 arc welded across the bottom of the tubes T as later explained. A prop member 11 is formed from heavy rod stock with a curved foot or ground contacting portion 11a at the free end of an elongated straight arm and with the opposite end sharply bent into a short straight pivot or shaft portion 11b extending through the housing. A latch or detent pin 12 extending diametrically through the shaft portion proximate the bend has opposite pin ends engaging a detent formation 13 in the adjacent right end of the housing. Inward of the detent formation, the housing tube is staked or bulged inwardly, at a plurality of points located at a plane substantially perpendicular to the housing axis, as at the diametric formations 14, to support in axial position a thick washer 15 preferably as shown in the drawing closely fitting the internal circumference of the housing and slip fitted therein; and through which as a centering element extends the shaft part of the prop.

A pre-stressed helical compression spring 16 is interposed on the shaft between the washer and a split retaining ring 17 engaged in a circumferential groove cut into the free shaft end projecting outward beyond the right end of the housing. The projections 14 provide the ultimate fixed reaction surface for the shaft biasing spring. The ring 17 is normally spaced away from the housing end to permit some operational axial shift of the shaft relative to the housing as the pin escapes from one latch position to another. The diameter of the round wire stock forming the spring 16 and dimensioning of the spring are such that the helix, externally supported by the housing, provides internally bearing surface for the shaft.

The detent or latch formation 13 includes one pair of diametrically located, deep round bottomed notches 21, in depth approximating the pin diameter, to receive the projecting ends of pin 12 when the arm is in retracted position of the stand as in Fig. 2; and a second similar pair of notches 22 to receive the pin ends with the arm is at the downward bicycle supporting position of the stand. As appears in Fig. 3, that arcuate span 23 of the housing end between each corresponding notch pair 21, 22 exceeding 90° is relieved to a depth about half the full notch depth to permit the pin to cam up the resulting shorter notch sides against the axial bias of spring 16 and escape to the other pair of notches, when a force is applied to the prop arm to shift it between its two extreme positions. The shorter arcuate spans 24 of the housing end serve as stops to prevent the pin over-riding the notches.

When the stand is dropped for use to the positions of Figs. 1 and 3, the pin 12 seats in horizontal notches 22, and upon retraction in notches 21, and for either position is held in the corresponding notches by the axially directed force of spring 16. As is apparent the pin and detent formation serves to keep the stand releasably latched in such positions. Since the desired operative position of the stand is downward and forward from the housing, and in the desired retracted position the general length of the prop underlies the adjacent prong of the fork in approximate parallel relation at an angular position somewhat greater than 90° from the supporting or down position, a corresponding angular spacing will be used for each corresponding notch pair 21, 22 cooperating with one projecting side of the pin. To cause the prop to swing up under the adjacent rear fork in approximate parallel retracted position, the housing is secured to the bottom of the fork tubes in a position turned (in Fig. 2) counterclockwise from perpendicular to the center plane of the frame.

In manufacture of the kick stand the prop member is cut and formed from rod stock by known methods to the shape indicated in the drawings, the groove for ring 17 and aperture for pin 12 being produced either before or after forming, depending upon fabrication methods found desirable; and the pin 12 is driven into or otherwise secured in the aperture. Of course proper angular relation of the pin aperture to the plane of the prop shaft and arm must be assured.

Although the housing could be fabricated by milling or otherwise cutting the detent formations in one end of an appropriate length of cylindrical tubular stock, the housing is desirably produced from flat sheet stock. In this method, flat steel stock, corresponding in gauge to the requisite housing wall thickness, is blanked out into flat approximately rectangular blanks but with one blank edge sheared in the blanking operation to the developed form of the detent end of the housing. The blank is then drawn transversely to the detent edge to a U-shaped form and curled around a mandrel to cylindrical form, preferably bringing the straight parallel ends of the blank into abutment along the length of the cylinder as at 30; and the inward depressions 14 are formed by staking the formed housing. Thereafter the housing is arc welded to the fork tubes. The washer 15 is next slipped into the housing, the pivot portion of the prop inserted from one side through the housing and washer, the spring pushed over the pivot end into the housing from the other side under compression, and finally the retainer ring 17 forced into the end groove on the pivot to complete the kick stand assembly on the bicycle frame. If desired for additional strength, the developed pattern of the detent notch formation sheared in one edge of the flat blank may be so placed in the blank that, with the detent formation of the finished housing properly oriented, the longitudinal line of abutment or proximity of the adjacent ends of the blank will fall in the area to be arc welded to the frame tubes, as at 30'.

I claim:

1. In a kick stand for a bicycle, a generally tubular housing comprised of cylindrically formed sheet metal and having adjacent free longitudinal edge portions in abutting relation, said housing having both said edge portions arc welded to and below each of the usual lower rear fork tubes of the bicycle frame and generally transversely thereto; said housing having at one end a pair of diametrically opposed detent formations each including a pair of angularly spaced endwise detent pin receiving notches and a portion in the angular spacing between the notches relieved endwise partway to the depth of the said notches; a washer adjacent and spaced inward from said one end of the housing; a prop arm member having one end bent at an angle to form a straight pivot shaft extending through said housing from said one end and through said washer, said shaft having at its free end a circumferential groove and at its other end a transverse detent pin for engagement with said detent formation; a split ring engaged in said groove outside the other end of said housing; and a pre-stressed compression spring interposed between said washer and said ring on said pivot shaft, said spring being circumferentially externally supported by said housing to serve as a substantially sole journalling element for said shaft, said housing having indented between its said one end and said washer a plurality of inwardly projecting circumferentially spaced washer supporting formations.

2. In a kick stand for a bicycle, a cylindrical tubular housing adapted to be secured to and below the rear fork tubes of the bicycle frame and generally transversely thereto; said housing having at one end a pair of diametrically opposed detent formations each including a pair of angularly spaced endwise notches and a portion in the angular spacing between the notches relieved endwise; a plurality of inwardly staked circumferentially spaced housing wall formations spaced inward from said one end of the housing; a pre-stressed compression spring coaxially disposed in the housing having one end supported by a thick washer-like element bearing axially on said staked formations, a prop arm member having one end bent at an angle to form a straight pivot shaft extending through said housing from said one end and through said spring, said spring being circumferentially supported by said housing whereby journalling support for said shaft is provided substantially solely by said spring, said shaft having at its free end a circumferential groove outside the other end of said housing and at its other end a transverse detent pin for engagement with said detent formation; and a split ring engaged in said groove for retaining said spring on said shaft and thereby holding the kick stand assembly together.

References Cited in the file of this patent

UNITED STATES PATENTS

| | | |
|---|---|---|
| 2,170,011 | Conner | Aug. 22, 1939 |
| 2,202,426 | Pawsat | May 28, 1940 |
| 2,229,551 | Cohen | Jan. 21, 1941 |
| 2,308,794 | Thompson | Jan. 19, 1943 |
| 2,372,214 | Loepsinger | Mar. 27, 1945 |
| 2,396,890 | Schwinn | Mar. 19, 1946 |
| 2,417,154 | Dath | Mar. 11, 1947 |
| 2,455,312 | Mueller | Nov. 30, 1948 |
| 2,763,924 | Bellometti | Sept. 25, 1956 |